US007210623B2

(12) United States Patent
Capurso et al.

(10) Patent No.: US 7,210,623 B2
(45) Date of Patent: May 1, 2007

(54) PRINTABLE SHELF LABEL

(75) Inventors: Robert G. Capurso, Bergen, NY (US); Stanley W. Stephenson, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 414 days.

(21) Appl. No.: 10/795,829

(22) Filed: Mar. 8, 2004

(65) Prior Publication Data

US 2005/0206586 A1 Sep. 22, 2005

(51) Int. Cl.
*G06K 15/00* (2006.01)

(52) U.S. Cl. ....................... 235/383; 235/375; 235/487

(58) Field of Classification Search ................ 235/383, 235/375, 487
See application file for complete search history.

(56) References Cited

U.S. PATENT DOCUMENTS

| | | | | |
|---|---|---|---|---|
| 5,111,196 | A | 5/1992 | Hunt | |
| 5,619,416 | A | 4/1997 | Kosarew | |
| 5,751,257 | A | 5/1998 | Sutherland | |
| 6,217,966 | B1 * | 4/2001 | Finster et al. | 428/42.1 |
| 6,253,190 | B1 | 6/2001 | Sutherland | |
| 6,552,663 | B2 | 4/2003 | Swartzel et al. | |
| 6,637,650 | B1 | 10/2003 | Capurso et al. | |
| 2004/0267699 | A1 * | 12/2004 | Zimmerman et al. | 707/1 |

* cited by examiner

*Primary Examiner*—Karl D. Frech
(74) *Attorney, Agent, or Firm*—Carl F. Ruoff

(57) ABSTRACT

A shelf label assembly includes a support, a display, and a printable overlay, wherein the printable overlay has a window through which the display can be viewed. The display can be written or rewritten electronically, and the overlay can be printed.

49 Claims, 6 Drawing Sheets

PRINTABLE SHELF LABEL

FIELD OF THE INVENTION

The present invention relates to an electronic shelf label assembly having as rewritable display and a printable overlay.

BACKGROUND OF THE INVENTION

Electronic shelf labels are becoming a popular and intelligent way to display product information on a shelf. The customer benefits by having all the information they need about the product, and the retailer benefits by having programmable information that can be readily changed by various electronic means. For example, prices can be kept up to date without printing new price changes. More permanent information can be printed on another portion of the electronic shelf label, such as a removable or permanent overlay that allows the electronic display to show through.

Exemplary electronic shelf labels as discussed above are shown and described in U.S. Pat. No. 5,111,196 issued to Hunt, U.S. Pat. No. 5,619,416 issued to Kosarew, U.S. Pat. No. 6,217,966 issued to Finster et al., and U.S. Pat. No. 6,552,663 issued to Swartzel et al. These patents describe electronic shelf labels that include a liquid crystal display, a mounting support, onboard electronics, a printable overlay, and a power source to provide viewability of the display at all times. One problem with the aforementioned devices is the need of a continuous power source and replacement of said power source on a regular basis. Without the power source, the display is blank.

To overcome the above problem, a bistable liquid crystal display that retains written information on the display in the absence of power can be used. One such electronic shelf label is shown and described in U.S. Pats. Nos. 5,751,257 and 6,253,190, both issued to Sutherland, which describe a system including an electronic shelf label having a bistable liquid crystal display for displaying price data and a Universal Product Code ("UPC") bar code, wherein the information programmed in the display remains on the display in the absence of power. The shelf label has a set of synchronizing indicators and corresponding electrical contacts on the front side of the display, which are capable of interacting with a hand-held device that is connected to a central computer that contains inventory and price information. The hand held device can be used to read the UPC bar code on the shelf label and update or write corresponding price information on the label. Both the UPC and the price information are shown on the display.

Including the UPC as a writable element on the shelf label significantly increases the complexity and cost of the shelf label. The resolution needed to produce UPC information requires 113 modules of data, and therefore a corresponding number of contacts on the front of the display. The UPC for a product typically does not change over the life of the product. Other static information, for example, a human readable description of the product, a unit identification (e.g. per oz. or per 100 sheets), or the like, can also be desirable on the display. The placement of static information such as the UPC in writable form on the shelf label unnecessarily complicates the display structure of the label.

One solution to the aforementioned problem is shown and described in U.S. Pat. No. 6,637,650 issued to Capurso et al. It describes an electronic shelf label including a bistable liquid crystal display, which displays information even in the absence of power. A printable overlay containing the bistable liquid display is provided on a printable overlay sheet. The retailer can print static information on the overlay sheet, peel off the overlay containing the display, and attach it to a support. The support provides electrical continuity to the display by way of conductive adhesive and embedded conductive strips. Once attached to the conductive adhesive, the embedded conductive strips in the support provide a front contact outside the overlay area for electronic interfacing in order to change the information on the display. However, careful alignment of the overlay with the embedded conductive strips in the support is required to provide power to the display. Further, because the display is part of the overlay, and is not powered as provided to the retailer, it is difficult to test the functionality of the display before assembly with the support.

There is a need for a shelf label having a conductively mounted display wherein the functionality of a support for the display and the display can be tested prior to reaching the retailer, and wherein static information can be provided separately from the display, for example, on an overlay.

SUMMARY OF THE INVENTION

An electronic shelf label assembly and a method of making the same is described, wherein the assembly includes a support, a display, and a printable overlay. The support has a display area, an overlay area adjacent the display area, an exposed area adjacent the overlay area, and a plurality of conductive contacts, wherein each of the plurality of conductive contacts has a first conductive portion within the display area and a second conductive portion in the exposed area. The display has a substrate, and a plurality of electrically conductive contact pads on the substrate. The display is attached to the display area of the support such that the first conductive portion of the conductive contacts of the support contact the electrically conductive contact pads of the display. The printable overlay has a window, and is attached to the overlay area of the support such that at least a portion of the display in the display area of the support is viewable through the window.

Advantages

The electronic shelf label assembly allows for pre-testing of the support and display prior to sale, updating of static information without effecting the display, updating of the display without effecting the static information, and viewing of the display information in the absence of power.

The drawings are exemplary only, and depict various embodiments of the invention.

DETAILED DESCRIPTION OF THE INVENTION

An electronic shelf label assembly including a display and printable overlay on a support can be sold to retail outlets for use in displaying changeable merchandise information. Static merchandise information can be provided on the assembly by the overlay, while changeable information can be written on the display and viewed through a window of the overlay. The support assembly can be pre-tested prior to sale to ensure display functionality. The overlay can be printed by the retailer and affixed to a corresponding support. A new overlay can be generated and affixed to the support if typically static information about the product changes. The term "static information" as used herein refers to product information which does not change often, for example, unit size, unit weight, product name, manufacturer name, trademark, UPC, bar code, or the like. Price changes can be made by updating the display electronically. The electronic shelf label assembly and methods of making it are described in detail with reference to the accompanying figures.

Figure 1:
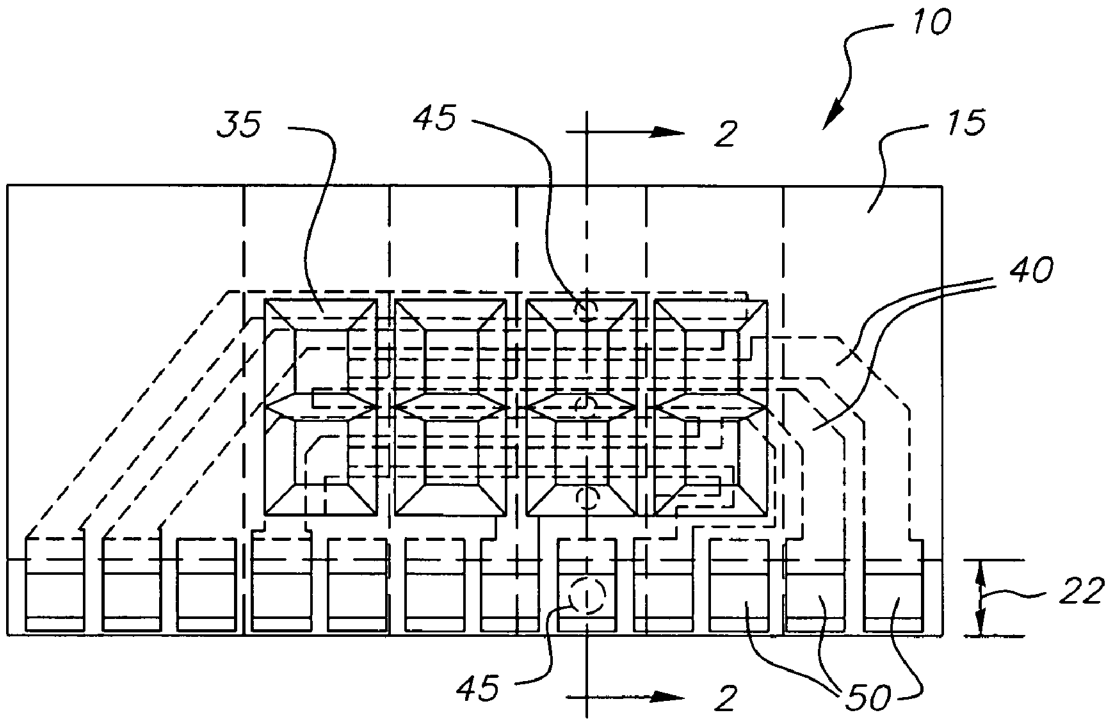
FIG. 1 is a front view of a character display.
Figure 2:
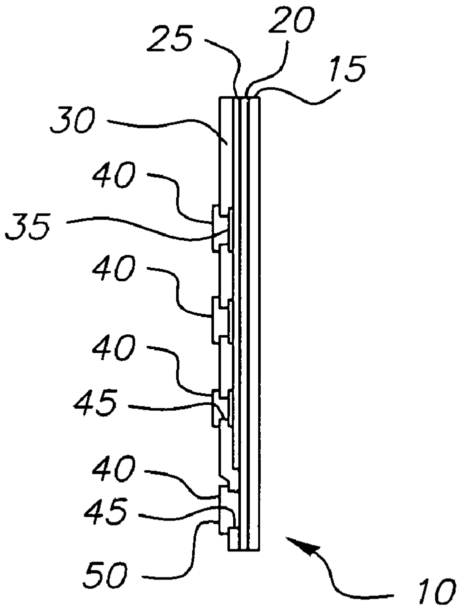
FIG. 2 is a cross sectional view of a character display taken along lines 2—2 in FIG. 1.

As shown in FIGS. 1 and 2, a character display 10 can be constructed by forming a conductive common electrode layer 20 on a substrate 15. The substrate can be any suitable material, for example, glass or plastic. When the substrate is plastic, it can be flexible, for example, a flexible self-supporting plastic film. "Plastic" means a polymer, usually made from polymeric synthetic resins, which can optionally be combined with other ingredients, such as curatives, fillers, reinforcing agents, colorants, and plasticizers. Plastic includes thermoplastic materials and thermosetting materials. Where a flexible plastic substrate is used, it can be reinforced with a hard coating, for example, an acrylic coating. The coating can have a thickness of from 1 to 15 microns, for example, from 2 to 4 microns. Various suitable hard coatings can be used, dependent upon the substrate material, and include a mixture of UV-cured polyester acrylate and colloidal silica, known as "Lintec" by Lintec Corporation of Tokyo, Japan, and an acrylic coating sold as Terrapin® by Tekra Corporation, New Berlin, Wis.

The common electrode layer is a conductive layer. It can include one or more metal oxide. A primary metal oxide can be indium oxide, titanium dioxide, cadmium oxide, gallium indium oxide, niobium pentoxide, or tin dioxide, for example. A secondary metal oxide can also be in the conductive layer, and can be, for example, an oxide of cerium, titanium, zirconium, hafnium and/or tantalum. See, U.S. Pat. No. 5,667,853 to Fukuyoshi et al. Transparent conductive oxides that can be used include, but are not limited to, $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. According to various embodiments, the common electrode layer can be tin-oxide, indium-tin-oxide (ITO), or polythiophene. The common electrode layer can be an opaque electrical conductor formed of metal such as copper, aluminum or nickel. If the conductive layer is an opaque metal, the metal can be a metal oxide to create a light absorbing conductive layer. The common electrode layer can be formed by any known method, including low temperature sputtering techniques and direct current sputtering techniques, such as DC-sputtering or RF-DC sputtering, depending upon the material or materials of the underlying layer. The common electrode layer can be preferably patterned, for example, into a plurality of electrodes.

A layer of bistable liquid crystal material 25 can be deposited over at least a portion of the conductive common electrode layer 20, leaving an exposed area 22 of the conductive common electrode layer 20. Bistable liquid crystal material can be used so that the display requires no power to maintain its state once electronically written. Bistable display materials that can be used include, for example, cholesteric nematic liquid crystal such as disclosed in U.S. Pat. No. 5,695,682, and electrophoretic particles such as those manufactured by Gyricon, LLC of Ann Arbor, Mich., and E-ink Corporation of Cambridge, Mass. The bistable liquid crystal material 25 can be formed on the conductive common electrode layer 20 by roll coating, placement of a preformed layer, or any other means known to practitioners in the coating arts. Application of fields of various intensity and duration change the state of bistable materials from a reflective to a transmissive state. These materials have the advantage of maintaining a given state indefinitely after the field is removed. Examples of suitable cholesteric liquid crystal materials include, but are not limited to, Merck BL112, BL118 or BL126, available from EM Industries of Hawthorne, N.Y.

Electrically conductive character segments 35 can be formed over the bistable liquid crystal material layer 25 by thick film printing, sputter coating, or other printing means. The conductive character segments can be any known aqueous conductive material, for example, carbon, graphite, or silver. An exemplary material is Electrodag 423SS screen printable electrical conductive material from Acheson Corporation. The conductive character segments 35 can be arranged to form numbers 0–9, a slash, a decimal point, a dollar sign, a cent sign, or any other alpha-numeric character or symbol.

A dielectric layer 30 such as deionized gelatin can be formed over the conductive character segments 35 by standard printing or coating techniques. Via holes 45 can be formed over each conductive character segment 35 by the absence of dielectric layer 30 over at least a portion of each conductive character segment 35, or by removing a portion of the dielectric layer 30 over each conductive character segment 35, for example, by ablation or chemical etching.

Electrically conductive traces 40 can be formed over the dielectric layer 30 by printing or coating techniques. One or more electrically conductive trace 40 can flow through a via hole 45 on formation, making electrical contact with the conductive character segments 35. The conductive traces 40 can extend from character segments 35 to the exposed area 22 along a side of the display 10, where the conductive trace 40 forms a contact pad 50 in exposed area 22.

The contact pads 50 can be any conductive material, for example, silver or carbon. The conductive pads 50 can be formed with the conductive traces 40, or separately therefrom. Conductive pads 50 that are not formed with the conductive traces 40 are coated on dielectric layer 30. A via hole 45 extends from the conductive pads 50 through dielectric layer 30 to the common electrode layer 20. The exposed area 22 and the contact pads 50 thereon can be formed along one side of the display 10, along multiple sides of the display 10, or in one or more locations on the display not including a conductive character segment 35. According to various embodiments, the contact pads 50 can be formed in exposed area 22 along one edge of the display 10. The contact pads 50 can be placed linearly or grouped, such as in a pattern, for example, a square or rectangle, in an exposed area 22.

The optical state of the bistable liquid crystal material 25 between the conductive character segment 35 and the common electrode layer 20 can be changed by selectively applying drive voltages to the corresponding contact pad 50 that is electrically connected to the conductive character segment 35 through a conductive trace 40 and to the electrode layer 20 by direct contact. Once the optical state of the bistable material has been changed, it remains in that state indefinitely without further power being applied to the electrodes. Methods of forming the character display 10 are known to practitioners in the art, and are described, for example, in U.S. Ser. No. 10/134,185, filed Apr. 29, 2002 by Stephenson et al.

Figure 3:
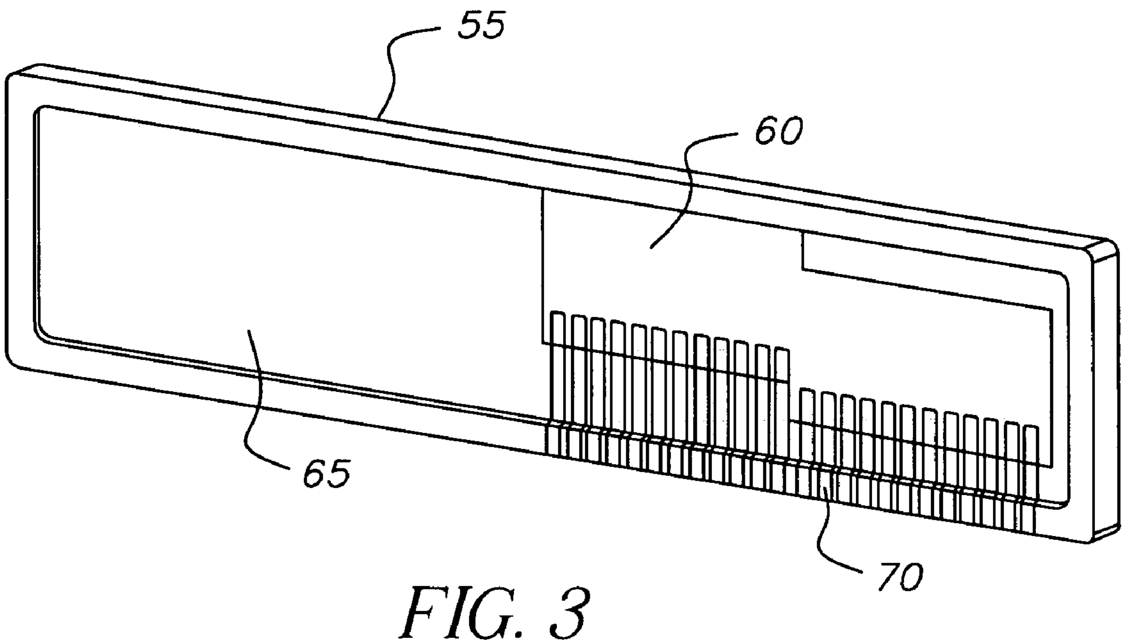
FIG. 3 is a front perspective view of a support with conductive strips inset into a surface of the support.

The character display 10 can be attached to a support 55. FIG. 3 shows a frontal perspective view of an embodiment of the support 55. The support 55 can be any suitable material, for example, plastic, glass, ceramic or the like. The support 55 can be shaped by any means known in the art. According to various embodiments wherein the support is plastic, the support 55 can be injection molded, press-molded, roll sheet, extruded, or the like. As shown in FIG. 3, the support 55 can have a plurality of conductive strips 70 inset within the support 55, or formed along a surface of support 55. Although conductive inlay strips are exemplified in FIG. 3, other forms of a conductive contact material can also be used in or on support 55, so long as the form of the conductive contact is electrically conductive and is capable of conveying such electrical charges to the conductive traces and common electrode layer of the display directly, or through the contact pad. For example, the conductive contact can be metal or a conductive plastic. It can be applied to the support by printing, as an appliqué, or other like techniques. The conductive contact can also be formed as part of the support, for example, by molding the conductive contact into the support.

According to various embodiments, the support 55 can be injection molded with conductive inlay strips 70 molded within it. The support 55 can have a recess 65 designed to accept printable overlay 100 for proper alignment of the overlay 100 onto the support 55. The recess 65 can be of sufficient size to accommodate the overlay 100 or can be larger than the overlay 100. The recess 65 can be of the same or a different shape as the overlay 100. The support 55 can have one or more clearance recess 60 for receiving one or more character display 10. Clearance recess 60 can be of sufficient size to enable the display 10 to adhere flatly onto support 55 in recess 60. The display 10 can fit into clearance recess 60 such that the visible surface of the display 10 is co-planar or nearly co-planar with either the surface of recess 65, if present, or the surface of the support 55. According to various embodiments, both recess 65 and clearance recess 60 can be present in support 55, as shown in FIG. 3.

As exemplified herein, the support has a recess for receiving a display, and a recess for receiving a printable overlay. The recesses provide advantages including clear indication of attachment points for the display and overlay, and provision of a planar or nearly planar surface on the shelf tag assembly. The attachment point for the display can be indicated by the recess as described; by a raised area of the support within which the display can be positioned; by a physical indication of the display area, for example, by a depression or raised area of the support immediately surrounding the display area, including tabs or lines; by visual marks, for example, at least a portion of a printed outline; or by placement of the electrical contacts. The attachment area for the overlay can be indicated by the recess as described; by a raised area of the support within which the display can be positioned; by a physical indication of the display area, for example, by a depression or raised area of the support immediately surrounding the display area, including tabs or lines; by visual marks, for example, at least a portion of a printed outline; or by alignment of the window of the overlay with the display.

Figure 4:
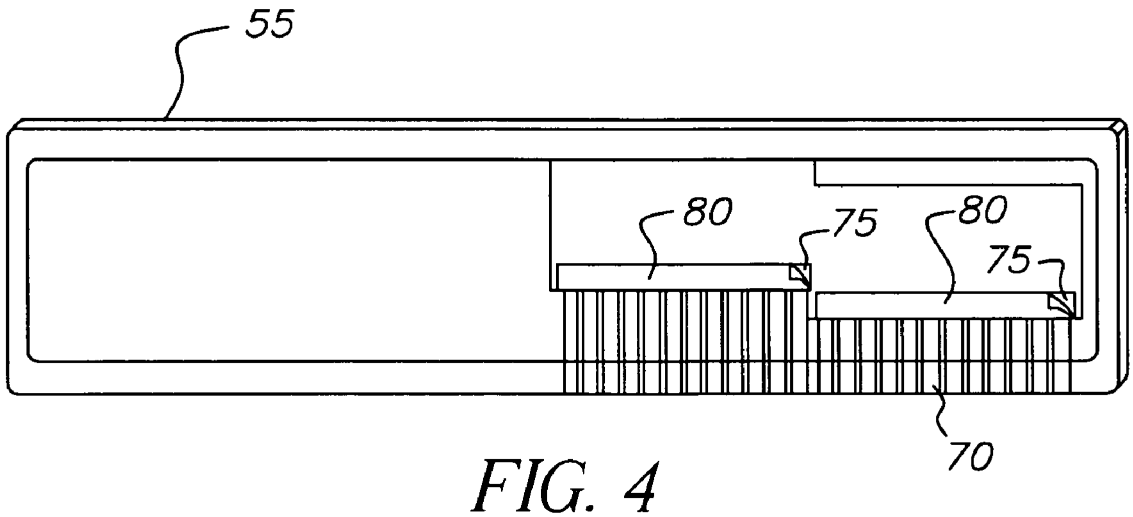
FIG. 4 is a perspective view of the front of a support having conductive strips inset into a surface of the support and conductive tape strips with adhesive backer liner positioned over the conductive strips.

The character display 10 can be attached to the conductive strips 70 of the support 55 through contact pads 50 with an adhesive. The adhesive can be in the form of a paste, sheet, layer, solvent coating, or the like, and can be coated on or adhered to the conductive strips 70, the contact pads 50, or both. According to various embodiments, the adhesive is a conductive adhesive. The conductive adhesive can be anisotropic. FIG. 4 depicts a front view of support 55 with conductive strips 70, having strips of conductive adhesive tape 75 applied over the conductive inlay strips 70. Conductive adhesive tape 75 can be applied with a backer liner 80 on one side, such that the adhesive tape 75 is not exposed. Backer liner 80 can be removed to expose conductive adhesive 75 for adhesion to the conductive contact pads 50 of character display 10 as the display 10 is attached to support 55. Placement of the conductive adhesive 75 between conductive contact pads 50 on display 10 and conductive inlay strips 70 provides electrical continuity between the conductive character segments 35 in character display 10 and the conductive inlay strips 70. According to various embodiments, the conductive strips 70 can be in direct physical contact with the contact pads 50.

Figure 5:
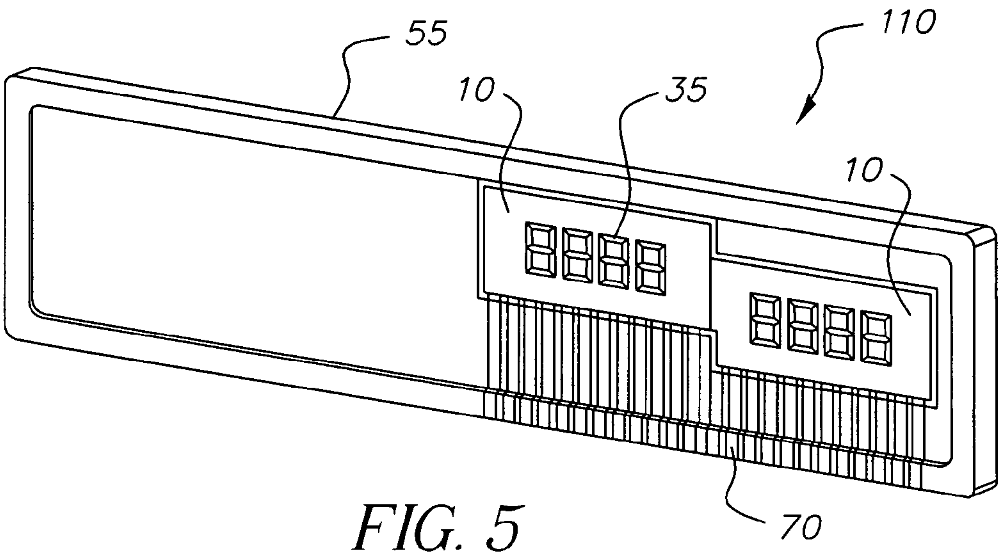
FIG. 5 is a perspective view of a support assembly, including a support and character displays attached to the support.

FIG. 5 illustrates a completed support assembly 110 having display 10 inserted into the support 55 such that each contact pad (not shown) of the display 10 is conductively connected to an inlay strip 70. The conductive inlay strips 70 are exposed on a surface of support 55 to allow electronic programming of the changeable conductive characters segments 35 on display 10. A printable overlay can be placed on support assembly 110 to provide static information.

Figure 6:
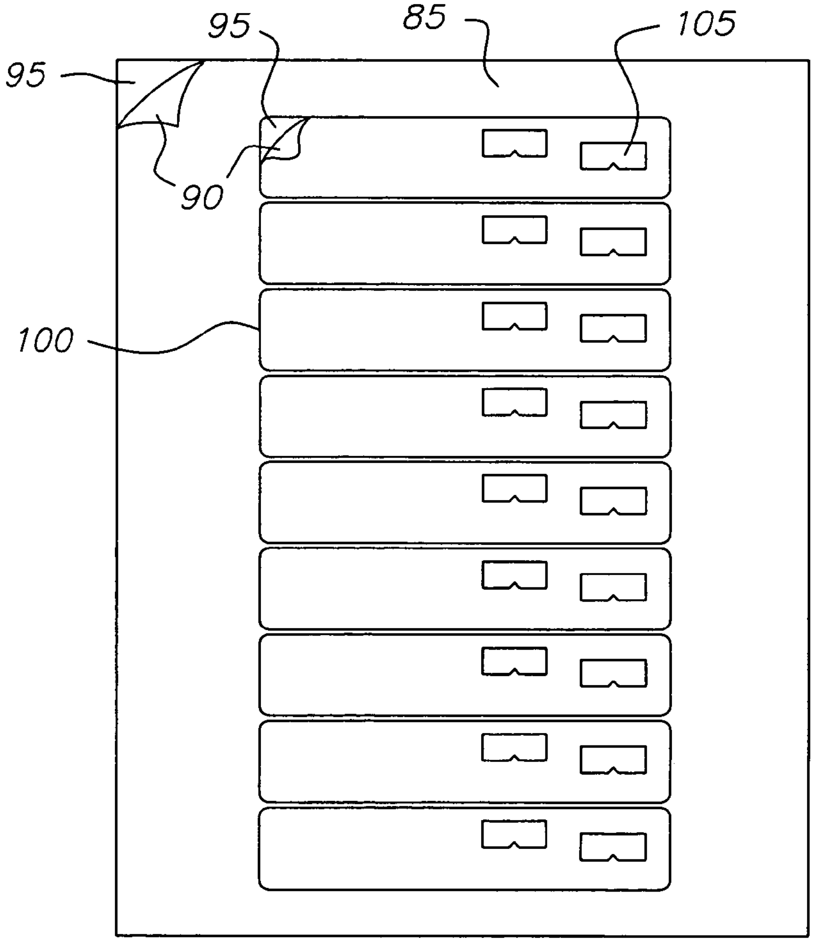
FIG. 6 is a front view of a printable sheet with individual labels positioned in an array.

A printable overlay can be supplied in any suitable printable form, for example, as individual printable labels, as a printable roll of multiple separable overlays, or in sheet form. The printable overlay can be any material suitable for printing, for example, paper or plastic. A plastic printable overlay can be transparent or opaque. An opaque overlay of paper or plastic can be any color. FIG. 6 shows a printable sheet 85 having a plurality of printable overlays 100. According to various embodiments, a printable sheet 85 can include one or more overlay 100. According to various embodiments, the printable sheet 85 can include an adhesive backing 90 and an adhesive backer liner 95, as shown in FIG. 6, such that the overlays can be adhered to support assembly 110 by an adhesive backing 90. According to various embodiments, each overlay 100 can be attached to support assembly 110 non-adhesively by use of a retainer, for example, tabs, slots, clips, brackets, or pegs on support 55 into or onto which the overlay 100 can be placed, respectively.

Each overlay 100 can have one or more window 105 corresponding to a position of a display 10 when the overlay 100 is placed on support assembly 110. The window 105 can allow all or only a portion of display 10 to be viewed. The windows 105 can be perforated or die cut through the printable sheet 85. According to various embodiments, the perforation or die cut can also extend through the adhesive backer liner 95 when present. Each printable overlay 100 can be die cut or formed by perforations through the printable sheet 100. The printable overlay 100 can have readable static information 120, for example, a bar code and/or item description, applied by printing. Printing can be performed by any known method, including but not limited to inkjet printing, thermal printing, electrophotography, and manual printing, for example, hand-lettering. The printed inks or colorants can be chosen for contrast to the overlay color.

According to various embodiments, the window in the overlay can be a transparent material, for example, a polymeric material or cellophane, that is adhesively secured to the overlay and capable of passing through a printer without damage, such as crinkling or melting of the transparent window. According to various embodiments, the entire overlay can be a transparent, printable material through which the display can be viewed. Where the entire overlay is transparent, the printing on the overlay should contrast the color of the support. For example, if the support is white, the print on the transparent overlay can be black, blue, red, green, or any color other than white. If the support is black, the print on the transparent overlay can be white, yellow, or any other contrasting color readable on a black background. A transparent window material can protect the display from environmental hazards and damage by touch.

Figure 7:
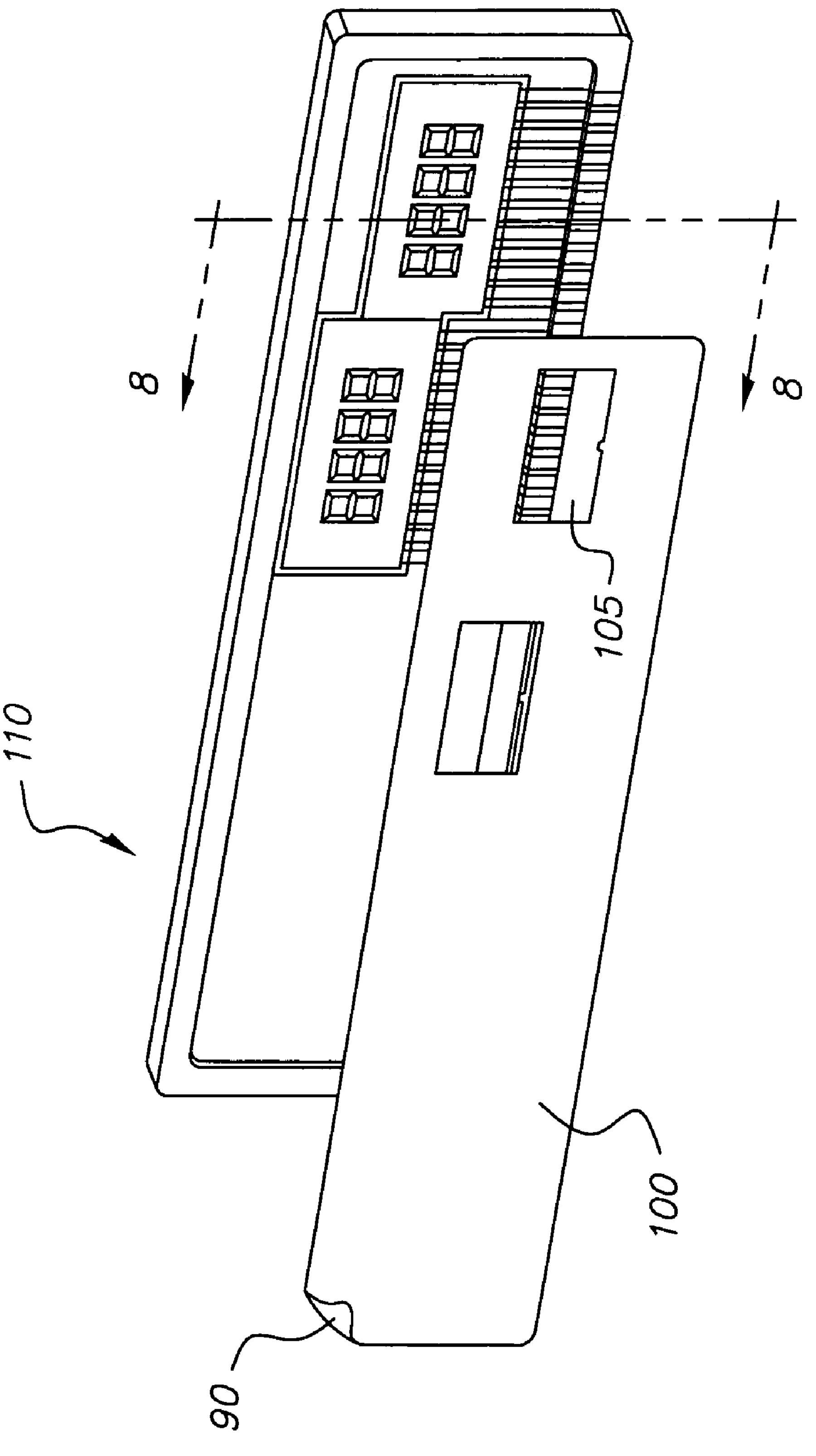
FIG. 7 is an exploded view of a shelf label assembly, including a printable overlay and support assembly.

FIG. 7 is an exploded view of a shelf label assembly 115. The shelf label assembly 115 is shown with printable overlay 100 having an adhesive backing 90, wherein the printable overlay 100 has been separated from the adhesive backer liner 95 of printable sheet 85 and is ready for attachment to the support assembly 110.

Figure 8:
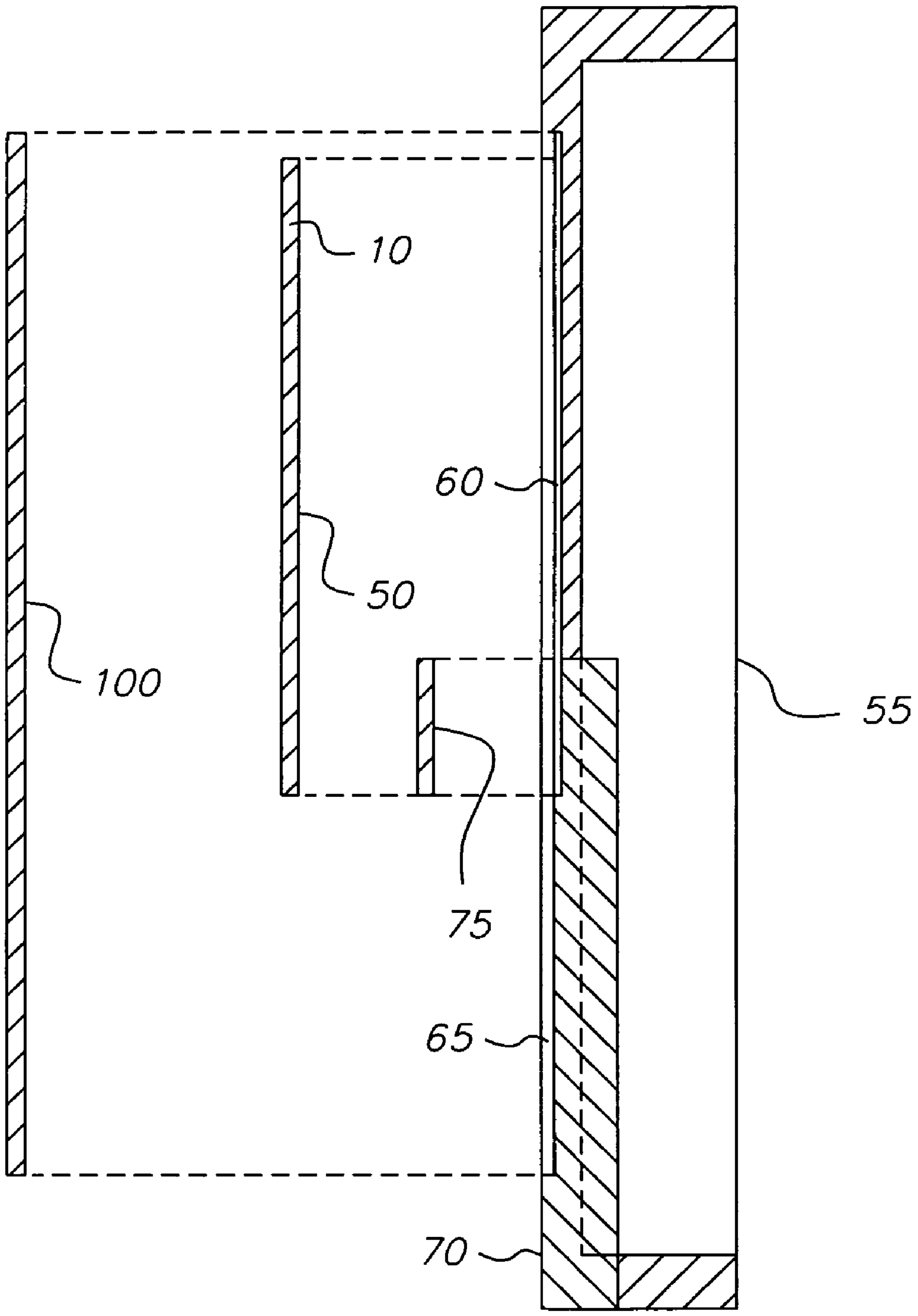
FIG. 8 is an exploded section view along line 8—8 of FIG. 7.

A cross-sectional exploded view of the shelf label assembly 115 along line 8—8 of FIG. 7 is depicted in FIG. 8. As shown in FIG. 8, the printable overlay 100 can overlap at least a portion of the display 10. The contact pads 50 can overlap at least a portion of the conductive adhesive 75, by which they are conductively attached to the conductive inlay strips 70. The display 10 and conductive adhesive can fit within recess 60, and the printable overlay 100 can fit within recess 65 of the support 55.

Figure 9:
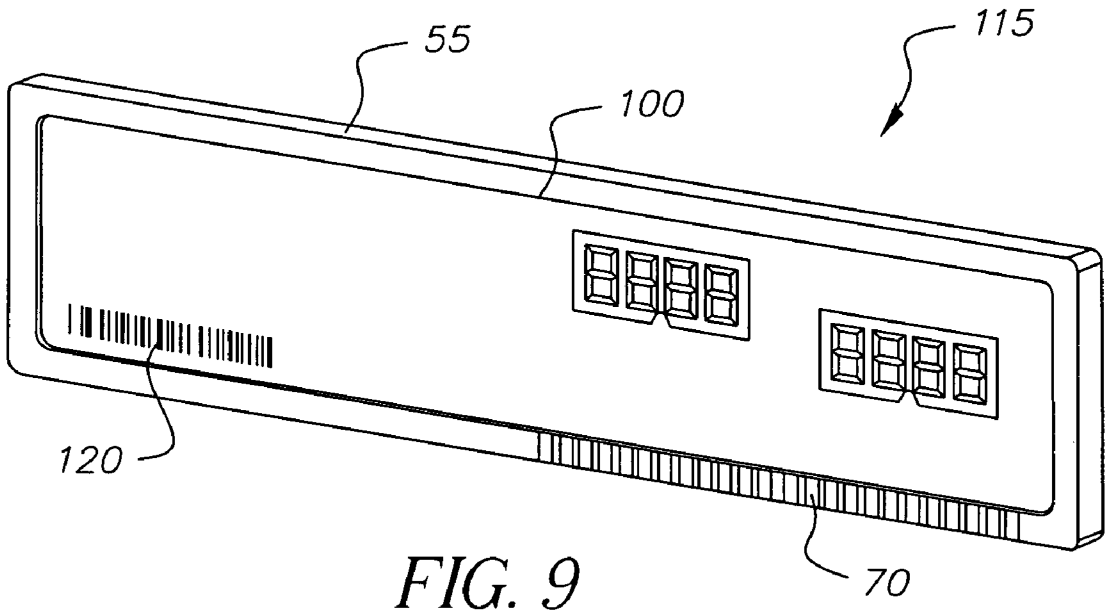
FIG. 9 is a shelf label assembly.

FIG. 9 is a front view of a completed shelf label assembly 115. At least a portion of the conductive inlay strips 70 are exposed on the support 55 outside the area covered by the printable overlay 100 to allow electrical contact through the strips 70 to the display. FIG. 9 demonstrates a possible placement of static information 120, a UPC, on the printable overlay 100. Information can be printed anywhere on the printable overlay, and can include multiple types of information, for example, a UPC, product number, weight, size, store code, manufacturer, product name, trademark, image, and the like. Temporary information can also be printed on the printable overlay, with the understanding that a new overlay will be required when such information changes. The overlay 100 is shown in FIG. 9 as covering most of the support 55 on the side from which the display is visible. The overlay 100 can cover a portion of the support 55 adjacent the display 10. A secondary overlay can be printed to cover another portion of the support 55 not including the display 10, or to cover or update information on the overlay 100 that has changed, thereby foregoing the need to print and attach a new overlay over or in place of an existing overlay 100.

Figure 10:
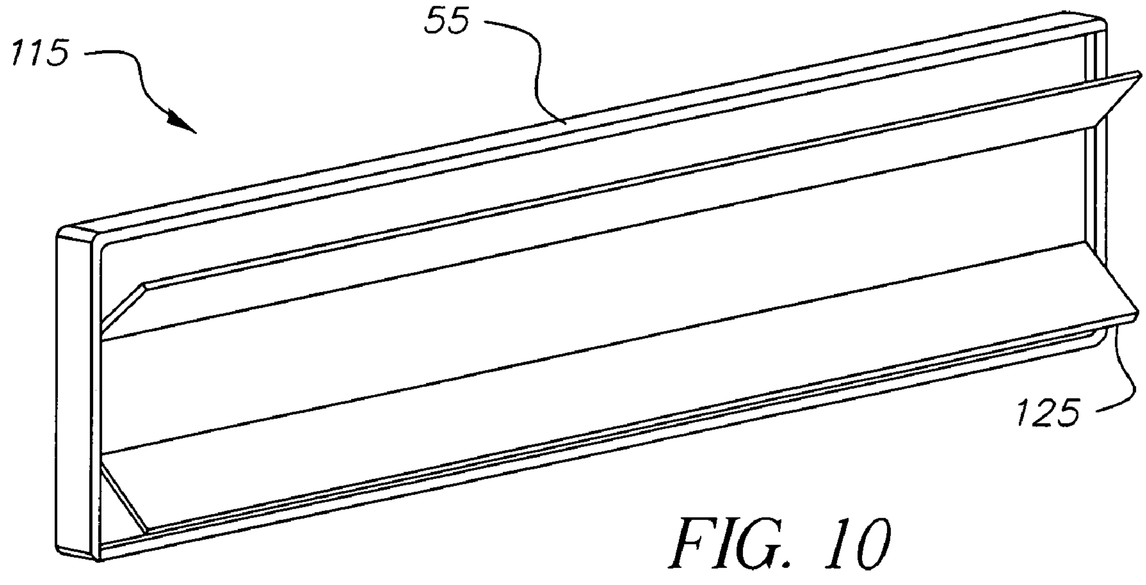
FIG. 10 is a back perspective view of a shelf label assembly having a bracket for attaching the electronic shelf label to an existing shelf label rail system.

The shelf label assembly can be attached to a shelving unit through the support. Various shelving attachments include a clip; a tab; a bracket; a fastener, for example, a screw, nail, or adhesive; or any other attachment method known for securing two items. Where a physical retainer such as a tab, clip, or bracket is used, the physical retainer can be formed as, or attached to, part of the support, and can interact with the shelving unit. The physical retainer can be formed as or attached to part of the shelving unit, and interact with the support of the shelf label assembly. FIG. 10 shows a rear perspective view of shelf label assembly 115, wherein a bracket 125 is formed on the support 55 for attachment to an existing shelf tag rail system.

The shelf label assembly can be used in a retail or storage environment to provide product information which can be changed as needed by rewriting the display, changing all or a portion of the overlay, or a combination thereof. In use, one or more displays can be attached to a support as indicated on the support, a printable overlay can be printed with information, the overlay can be applied to the support including the one or more display, and the display can be written by electrically activating various display segments through the conductive inlay strips on the support. The support can be attached to a shelving unit or other display unit for viewing of the information on the display and overlay.

The invention has been described in detail with particular reference to certain preferred embodiments thereof, but it will be understood that variations and modifications can be effected within the spirit and scope of the invention.

PARTS LIST

10 display
15 substrate
20 common electrode layer
22 exposed area
25 bistable liquid crystal layer
30 dielectric layer
35 conductive character segment
40 conductive traces
45 via holes
50 tag contact pad
55 support
60 recess in support for tag
65 recess in support for printable overlay
70 conductive inlay strips
75 conductive adhesive strip
80 conductive adhesive backer liner
85 printable sheet
90 adhesive backing
95 adhesive backer liner
100 printable overlay
105 perforated window
110 support assembly
115 shelf label assembly
120 static information
125 bracket

The invention claimed is:

1. A method of making an electronic shelf label assembly, comprising:

providing a support comprising a display area, an overlay area adjacent the display area, an exposed area adjacent the overlay area, and a plurality of conductive contacts, wherein each of the plurality of conductive contacts comprises a first conductive portion within the display area and a second conductive portion in the exposed area;

providing a bistable display comprising a substrate and a plurality of electrically conductive contact pads on the substrate;

attaching the display to the display area of the support, wherein the first conductive portion of the conductive contacts of the support contact the electrically conductive contact pads of the display;

providing a printable overlay comprising a window; and attaching the printable overlay to the overlay area of the support such that at least a portion of the display in the display area of the support is viewable through the window.

2. The method of claim 1, further comprising printing the printable overlay.

3. The method of claim 2, wherein printing the printable overlay is done by ink jet printing, thermal printing, electrophotographic imaging, or manual printing.

4. The method of claim 2, wherein the printing comprises an alphanumeric character, an image, a symbol, a Universal Product Code, or a combination thereof.

5. The method of claim 1, wherein an electrically conductive adhesive is applied to the first conductive portion of the conductive contacts of the support, to the electrically conductive contact pads of the display, or both.

6. The method of claim 5, wherein the adhesive is an anisotropic adhesive.

7. The method of claim 5, wherein the adhesive is an adhesive strip.

8. The method of claim 1, wherein the printable overlay is adhesively attached to the support.

9. The method of claim 8, wherein the printable overlay comprises an adhesive backside, and wherein the backside of the printable overlay is attached to the support.

10. The method of claim 1, wherein providing the printable overlay includes peeling the overlay from a backing sheet, wherein the printable overlay comprises an adhesive backside.

11. The method of claim 1, wherein the support further comprises a retainer.

12. The method of claim 11, wherein the printable overlay is attached to the support using the retainer.

13. The method of claim 11, wherein the retainer is a tab, slot, clip, bracket, peg, or combination thereof.

14. The method of claim 1, wherein the window of the printable overlay comprises a transparent material.

15. The method of claim 1, wherein the printable overlay comprises a transparent material.

16. The method of claim 1, wherein a second display is attached to the support.

17. The method of claim 1, wherein providing the printable overlay comprises removing the printable overlay from a sheet comprising a plurality of printable overlays.

18. The method of claim 1, wherein providing the printable overlay comprises removing the printable overlay from a roll comprising a plurality of printable overlays.

19. The method of claim 1, wherein the display further comprises a first electrode layer on the substrate, a layer of bistable material on at least a portion of the first electrode layer, patterned electrically conductive ink on at least a portion of the bistable material, dielectric material over at least a portion of the bistable material, and a second electrode layer over the dielectric material and in contact with the patterned electrically conductive ink, wherein the plurality of electrically conductive contact pads are on the first electrode layer and in contact with the second electrode layer.

20. The method of claim 19, wherein the bistable material is cholesteric nematic liquid crystal material.

21. An electronic shelf label assembly, comprising:

a support comprising a display area, an overlay area adjacent the display area, an exposed area adjacent the overlay area, and a plurality of conductive contacts, wherein each of the plurality of conductive contacts comprises a first conductive portion within the display area and a second conductive portion in the exposed area;

a display comprising a substrate, a first electrode layer on the substrate, a layer of bistable material on at least a portion of the first electrode layer, patterned electrically conductive ink on at least a portion of the bistable material, dielectric material over at least a portion of the bistable material, and a second electrode layer over the dielectric material and in contact with the patterned electrically conductive ink, and a plurality of electrically conductive contact pads are on the first electrode layer and in contact with the second electrode layer, wherein the display is attached to the display area of the support, and wherein the first conductive portion of the conductive contacts of the support contact the electrically conductive contact pads of the display; and a printable overlay comprising a window, wherein the printable overlay is attached to the overlay area of the support such that at least a portion of the display in the display area of the support is viewable through the window.

22. The assembly of claim 21, wherein the printable overlay is printed.

23. The assembly of claim 22, wherein the printing is ink jet printing, thermal printing, electrophotographic imaging, or manual printing.

24. The assembly of claim 22, wherein the printing comprises an alphanumeric character, an image, a symbol, a Universal Product Code, or a combination thereof.

25. The assembly of claim 21, further comprising an electrically conductive adhesive on the first conductive portion of the conductive contacts of the support, on the electrically conductive contact pads of the display, or both.

26. The assembly of claim 25, wherein the adhesive is an anisotropic adhesive.

27. The assembly of claim 25, wherein the adhesive is an adhesive strip.

28. The assembly of claim 21, wherein the printable overlay comprises an adhesive backside that contacts the support.

29. The assembly of claim 28, wherein the printable overlay further comprises a peelable backing sheet on the adhesive backside.

30. The assembly of claim 21, wherein the window of the printable overlay comprises a transparent material.

31. The assembly of claim 21, wherein the printable overlay comprises a transparent material.

32. The assembly of claim 21, wherein the printable overlay is one of a plurality of printable overlays on a printable media.

33. The assembly of claim 32, wherein the printable media is in roll form.

34. The assembly of claim 32, wherein the printable media is in sheet form.

35. The assembly of claim 21, wherein the printable overlay comprises more than one window.

36. The assembly of claim 21, comprising more than one display.

37. The assembly of claim 21, wherein the support further comprises a retainer.

38. The assembly of claim 37, wherein the printable overlay is attached to the support with the retainer.

39. The assembly of claim 37, wherein the retainer is a tab, slot, clip, bracket, peg, or combination thereof.

40. The assembly of claim 21, wherein the support further comprises a shelving attachment.

41. The assembly of claim 40, wherein the shelving attachment comprises a tab, clip, bracket, fastener, or combination thereof.

42. The assembly of claim 21, wherein the plurality of conductive contacts are printed on the support.

43. The assembly of claim 21, wherein the support is injection molded plastic.

44. The assembly of claim 43, wherein the plurality of conductive contacts are molded into the support.

45. The assembly of claim 44, wherein the conductive contacts are metal or conductive plastic.

46. The assembly of claim 21, wherein the plurality of conductive contacts are a conductive appliqué on the support.

47. The assembly of claim 21, wherein the overlay area of the support comprises a recess in the support.

48. The assembly of claim 21, wherein the display area of the support comprises a recess in the support.

49. The assembly of claim 21 wherein the bistable material is cholesteric nematic liquid crystal material.

* * * * *